United States Patent [19]
Kao

[11] Patent Number: 5,146,567
[45] Date of Patent: Sep. 8, 1992

[54] KEYBOARD INTERFACE

[75] Inventor: Kent Kao, Taipei, Taiwan

[73] Assignee: Acer Incorporated, Taiwan

[21] Appl. No.: 397,000

[22] Filed: Aug. 22, 1989

[51] Int. Cl.[5] .................. G06F 15/02; G06F 3/02; G06F 11/28
[52] U.S. Cl. .................. 395/325; 364/DIG. 1; 364/234; 364/234.1; 364/239.8; 364/264; 364/264.6
[58] Field of Search ........... 364/200, 900, DIG. 1, 364/DIG. 2; 395/250, 325

[56] References Cited

U.S. PATENT DOCUMENTS

| | | | |
|---|---|---|---|
| 3,774,161 | 11/1973 | Chambers | 340/172.5 |
| 3,872,446 | 3/1975 | Chambers | 340/172.5 |
| 4,460,957 | 7/1984 | Eggebrecht et al. | 364/DIG. 1 |
| 4,482,955 | 11/1984 | Amano et al. | 364/200 |
| 4,513,390 | 4/1985 | Walter et al. | 364/900 |
| 4,523,298 | 6/1985 | Sakurai | 364/900 |
| 4,527,250 | 7/1985 | Galdun et al. | 364/900 |
| 4,644,497 | 2/1987 | Tajima et al. | 364/DIG. 2 |
| 4,814,712 | 3/1989 | Burton et al. | 324/424 |
| 5,056,057 | 10/1991 | Johnson et al. | 364/900 |

FOREIGN PATENT DOCUMENTS 0266790 5/1988 European Pat. Off. .

Primary Examiner—Michael R. Fleming
Assistant Examiner—Ayaz R. Sheikh
Attorney, Agent, or Firm—Greg T. Sueoka

[57] ABSTRACT

A computer keyboard interface is disclosed with an improved system for controlling the signals on a clock line and a data line for communication between the keyboard interface and the system interface. Two bi-directional input/output ports are used, one for the clock line and one for the data line. The data and clock lines are then used not only for the transmission of data but also used by the keyboard interface for sensing status signals from the system interface. This simplifies the keyboard interface design.

15 Claims, 7 Drawing Sheets (KB→SYSTEM)

(KB → SYSTEM)

KEYBOARD INTERFACE

BACKGROUND OF THE INVENTION

This invention relates in general to keyboard interfaces and in particular to a keyboard interface with an improved system for sensing and controlling the communication of data between the keyboard interface and a system interface.

In many computer systems, the input of data to a central processing system is by punching keys on a keyboard. The keyboard is normally equipped with a keyboard interface containing control logic for controlling the input information from the keys. In conventional technology, the keyboard interface communicates with the system interface through a data line and a clock line. The communication between the two interfaces is controlled by both interfaces. The system interface will need to communicate to the keyboard interface its status, such as interrupt signals to indicate that it is not yet ready to receive data. The system interface communicates its status by means of status signals to the keyboard interface through the same clock and data lines. In conventional keyboard interface systems, the status signals from the system interface are sensed through a sense clock line connected to the clock line and a sense data line connected to the data line. The data and clock lines also include gates to prevent the status signals from the system interface from otherwise affecting the keyboard interface.

In the above described conventional keyboard interface control system, a sensed clock line and a sensed data line as well as two gates are required. It is desirable to simplify the construction of the keyboard interface and to achieve cost savings by reducing the electronic components for achieving the same function and purpose. It is therefore desirable to provide an improved and simpler keyboard interface with fewer components.

SUMMARY OF THE INVENTION

This invention is based on the recognition that the keyboard interface control system can be simplified by employing two input/output ports for connecting the keyboard interface with the clock line and the data line. Clock signals and data may be conveyed between the two interfaces through the clock and data lines and, the two ports. In addition, status signals such as interrupt signals from the system interface on the clock and data lines may also be sensed through the two input/output ports. The keyboard interface control system of this invention therefore is simpler since no separate sense clock line or sense data line is required. As compared to the conventional design, the two gates required in conventional design can simply be eliminated.

The keyboard interface apparatus of this invention comprises a keyboard interface having a first and a second input/output port, a clock line connecting the first port to a system interface and a data line connecting the second port to the system interface. The keyboard interface senses the two lines through the two ports for detecting status signals from the system interface through the two lines and the two input/output ports. The keyboard interface senses the two lines through the two ports and controls transmission and reception of data from the system interface through the data line and the second port.

The method of transmission in this invention is applicable to a keyboard interface control system of the type described above in the summary of the invention. In such system, the system interface communicates interrupt signals to the keyboard interface by affecting the logic levels of the clock and data lines. The method comprises transmitting data to a system interface through the data line wherein the transmitting step comprises applying predetermined sequences of logic levels to the two lines. The logic levels of the two lines are then sensed by the keyboard interface to detect any interrupt signals from the system interface where the interrupt signals affect the logic levels of the two lines. Upon sensing an interrupt signal, the transmission of data is terminated. In the sensing step, interrupt signals are detected by sensing whether the logic level of at least one of the two lines is different from those set by the keyboard interface.

Another aspect of the invention is directed towards a method for controlling the reception of data by a keyboard apparatus from a system interface where the keyboard apparatus includes a keyboard interface, a clock line and a data line connecting the two interfaces. The system interface transmits a parity bit in addition to data bits to the keyboard interface. The method comprises setting the clock and data lines to predetermined logic levels and sensing status signals from the system interface. When the status signal indicates data reception, the keyboard interface then receives data from the system interface through the data line. The method also comprises parity checking the data received to determine the accuracy of reception.

DETAILED DESCRIPTION OF THE INVENTION

Figure 1:
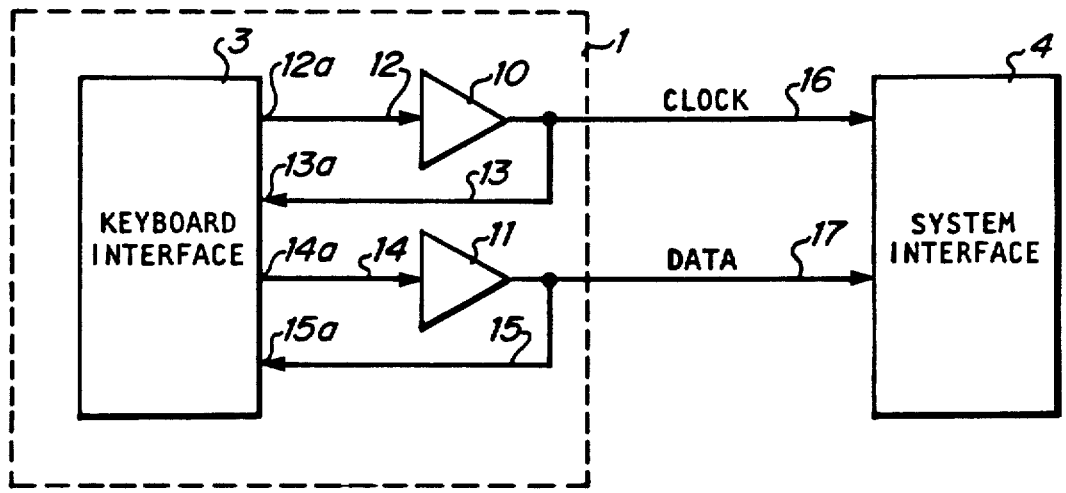
FIG. 1 is a block diagram of a keyboard interface and a system interface with clock and data lines as well as sensed clock line and sense data line to illustrate a conventional keyboard interface control system.

FIG. 1 is a functional block diagram of a keyboard interface, a system interface, clock and data lines, a sense clock line and a sense data line to illustrate a conventional keyboard interface control system. As shown in FIG. 1, the keyboard interface control system 1 transmits data to a system interface 4 through a data line 17 assisted by clock signals also sent by system 1 to system interface 4 through a clock line 16. The keyboard interface system 1 includes a keyboard interface 3, a sense clock line 13 and a sense data line 15 and two gates 10, 11. The system interface communicates its status by means of status signals to the keyboard interface through the clock and data lines 16, 17, sense clock and data lines 13, 15 and input ports 13a, 15a. The two gates 10, 11 are buffers used to prevent any status signals from the system interface 4 on lines 16, 17 from affecting the output ports 12a, 14a of the keyboard interface. When the keyboard interface 3 senses through lines 13, 15 that no interrupt signal has been detected from system interface 4, clock signals are transmitted through line 12, gate 10 and line 16 to system interface 4 to assist the transmission of data sent at the same time through line 14, gate 11 and line 17. The status signals from system interface 4 are sensed through lines 13, 15 and input ports 13a, 15a by the keyboard interface 3. The clock signals and data signals are sent through output ports 12a, 14a. Thus the conventional system of FIG. 1 requires separate input and output ports, separate sensing lines 13, 15 and buffer gates 10, 11.

Figure 2:
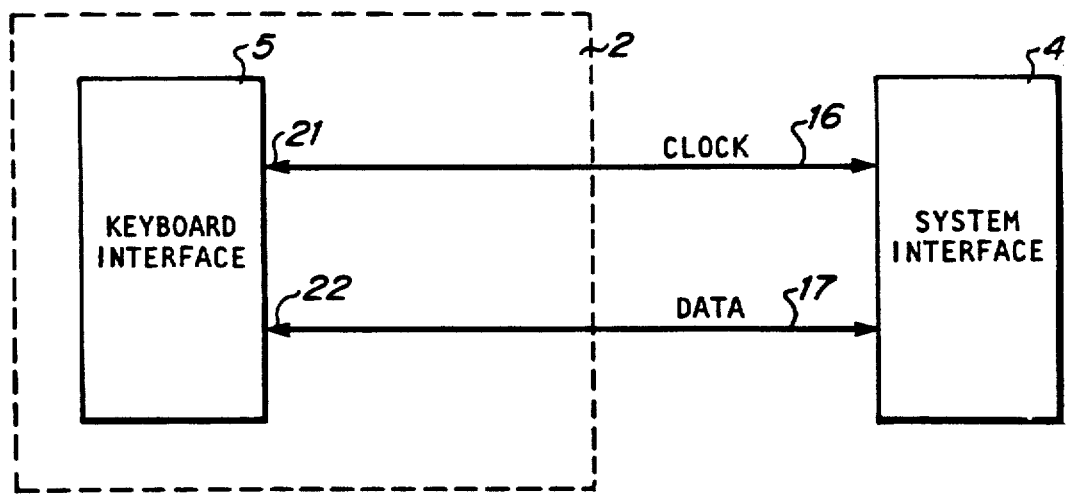
FIG. 2 is a functional block diagram of a keyboard interface and a system interface with clock and data lines to illustrate the invention.

This invention is based on the observation that the keyboard interface system can be simplified to achieve a more cost effective design. The keyboard interface system of this invention is illustrated in the block diagram of FIG. 2. As shown in FIG. 2, the keyboard interface system 2 includes a keyboard interface 5 with two input/output ports 21, 22 for transmitting clock signals and data signals through lines 16, 17 as well as sensing the status signals from the system interface 4 present on these two lines. System 2 is therefore simpler than system 1 of FIG. 1. This reduces the complexity of the system and permits system 2 to be made on a single chip.

The system of FIG. 2 is suitable for the transmission of serial data between the two interfaces. System 2 or interface 5 includes a microprocessor (not shown in FIG. 2). The input/output 21, 22 are for transmitting clock and data signals to and receiving same from system interface 4 as well as for sensing the status signals from system interface 4 through lines 16, 17.

Keyboard interface 5 will interpret the status signals sent from system interface 4 before and during the data transmission and reception processes between the two interfaces. Before the keyboard interface starts transmitting the data to the system interface, it checks the presence of any status signals from the system interface. Since the clock and data lines are used for data transmission as well as for the transmission of status signals, the keyboard interface will need to distinguish between signals on the two lines used for data transmission and status signals from the system interface on the same two lines. It does so by applying predetermined logic signals to the clock and data lines for the purpose of data transmission and then detecting whether the logic levels of the two lines are different from those set by the keyboard interface. The keyboard interface initiates data transmission by sending a start bit indicating that the bits that follow are data bits. Before the start bit has been transmitted, in the preferred embodiment the keyboard interface pulls both clock and data lines high and then detects whether the clock line or the data line or both have been pulled low by the system interface to indicate an interrupt. If either or both lines have been pulled low, the keyboard interface aborts the transmission process. After the start bit has been transmitted, the keyboard interface detects only whether the clock line (but not the data line) has been pulled low when the keyboard interface has set the clock line to high, in order to detect status signals from the system interface.

Thus, before the start bit has been transmitted, the keyboard interface pulls both the clock and data lines high. When the system interface pulls both the clock line 16 and data line 17 low, this represents the status signal from the system interface that the keyboard interface 5 should stop sending data and should be prepared to receive data. When system interface 4 pulls the clock line 16 high and the data line 17 low, this represents the status signal from the system interface that the keyboard interface should start receiving data from the system interface. When clock line 16 is pulled low and data line 17 is pulled high by the system interface, this represents the status signal that the keyboard interface should stop transmitting data. When the clock and data lines 16, 17 are both pulled high by the system interface, this represents the status that the keyboard interface 5 is permitted to transmit data to the system interface 4. The four status signals from the system interface are illustrated in the table below.

| CLOCK | DATA | FUNCTION |
| --- | --- | --- |
| Low | High | System inhibit keyboard (KB) |
| Don't care | Low | System wants to send data to KB |
| Low first | Low | System wants to send data to KB |
| High | High | KB may transmit to system |

Before the initiation of data transmission, the keyboard interface 5 first pulls clock line 16 and data line 17 high and then senses the logic levels of the two lines. The logic levels of the two lines sensed then indicate one of four possible status signals from system interface 4.

The clock and data lines are also used for the communication of digital data between the two interfaces. A microprocessor (not shown in FIG. 2) in interface 5 controls the communication of data on the two lines, where level trigger is employed. Thus, the keyboard interface 5 will load data onto data line 17 only when the clock signal is previously at the high logic level (i.e. high, e.g. at time t5 in FIG. 6). Interface 5 will accept data from line 17 only when the clock line is at the high logic level (i.e. high, e.g. at time t5 in FIG. 7). These features are illustrated in more detail in the timing diagrams of FIGS. 6 and 7.

The serial communication of data between interfaces 4, 5 is illustrated by the communication of 11 bits, including a start bit code, eight data bits (bit 0-bit 7), a parity check bit code and a stop bit code. In the preferred embodiment the start bit code is represented by the low logic level and the stop bit code by the high logic level.

In the preferred embodiment, odd parity check is employed. In other words, when the number of ones added to the value of a parity check bit is odd, that means the data has been transmitted without error.

Figure 3A:
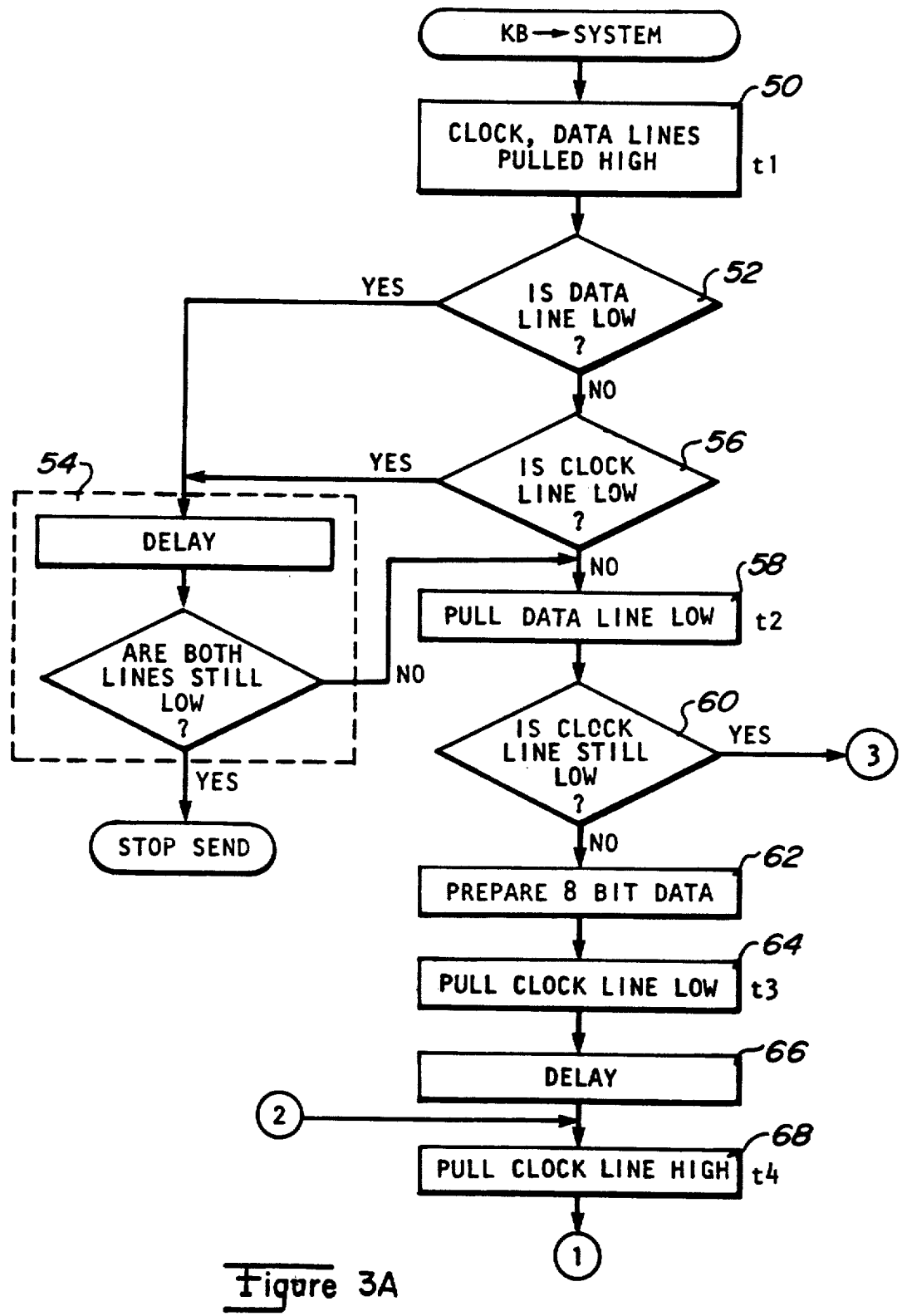
FIGS. 3A, 3B are flow charts for illustrating the transmission of data from the keyboard interface to the system interface in the configuration of FIG. 2.
Figure 3B:
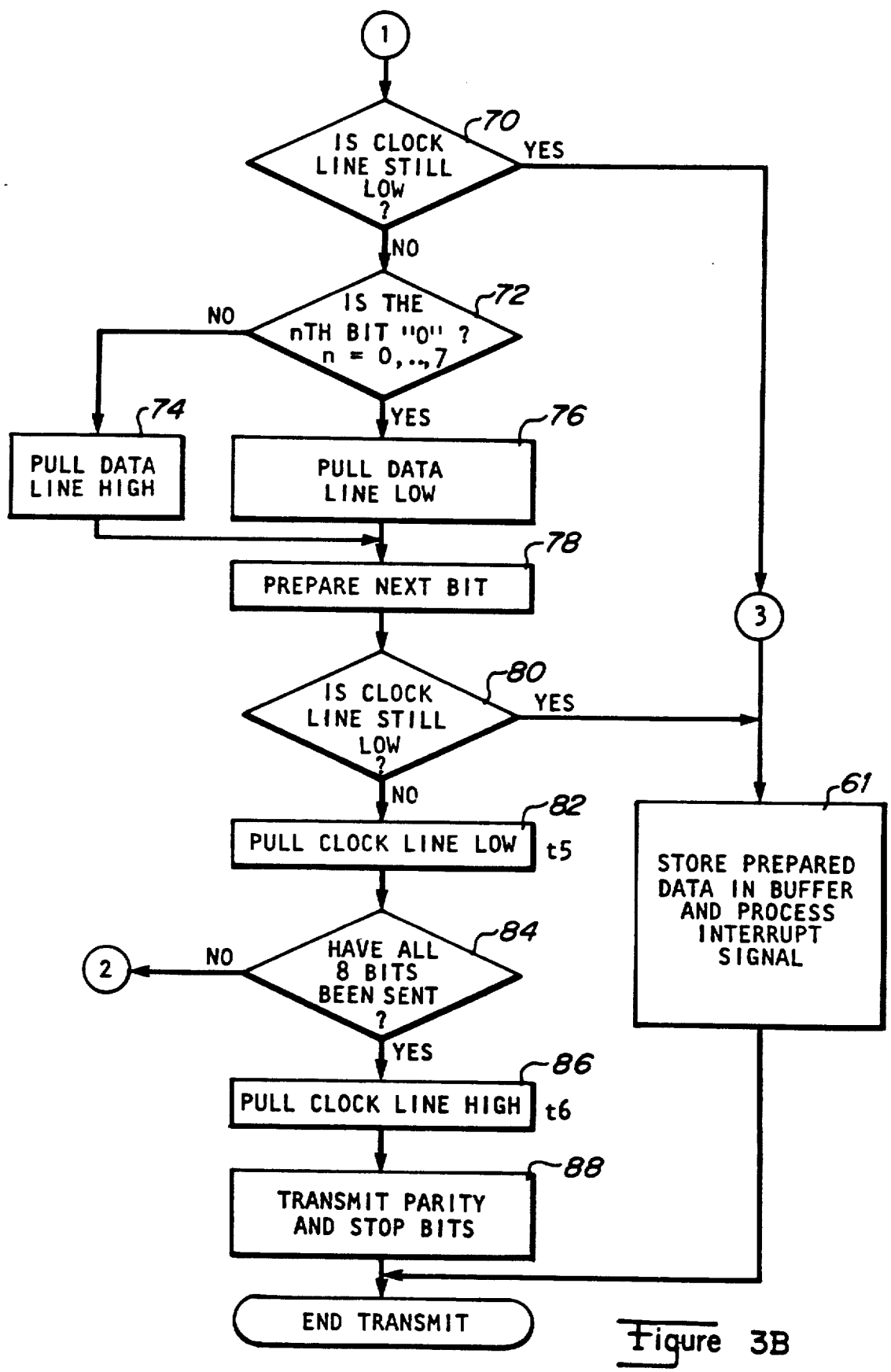

FIGS. 3A, 3B are flow charts illustrating the steps by which the keyboard interface transmits data to the system interface. Unless specified otherwise, the steps described are those taken by the keyboard interface. First the clock line 16 and data line 17 are pulled to the high logic level (block 50), as shown at time t1 in FIG. 6. Data line 17 is sensed through port 22 (diamond 52). If the data line is low, the keyboard interface executes a sub-routine 54 which is set forth in more detail in FIG. 4. If the data line remains high, the keyboard interface further checks to see if the clock line is low (diamond 56). If the clock line is low, the keyboard interface also executes sub-routine 54 of FIG. 4.

Steps 50 through 56 are executed before any data is transmitted. Thus before the keyboard interface is ready to transmit any data, it pulls both lines high and detects whether either one or both lines have been pulled low by the system interface. If either or both lines have been pulled low by the system interface for a predetermined time period the transmission process is terminated. The subroutine for checking whether either or both lines have been pulled low by the system interface to indicate an interrupt signal will be explained in more detail below in reference to FIG. 4.

Figure 6:
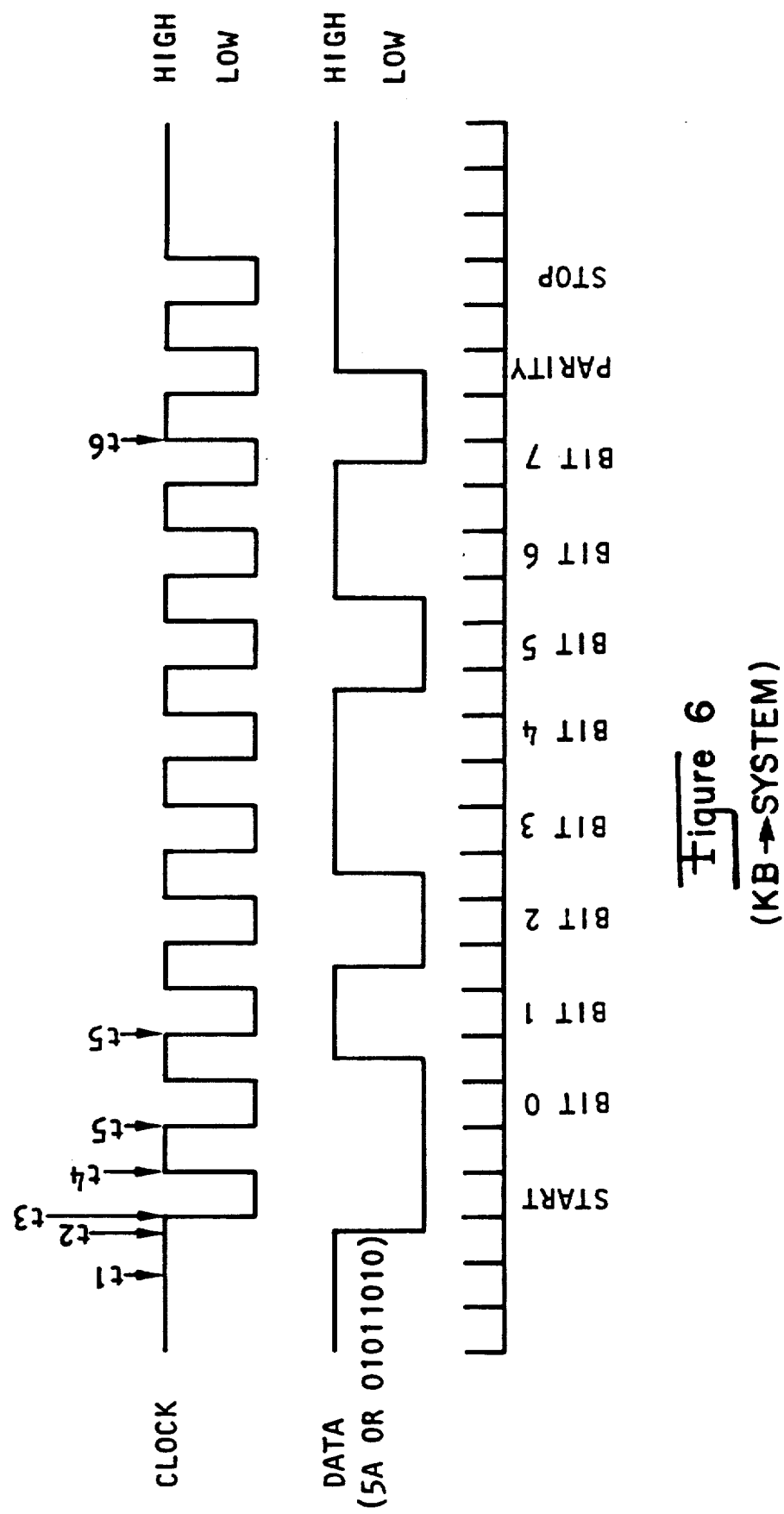
FIG. 6 is a timing diagram illustrating the transmission of data from the keyboard interface to the system interface.

Assuming that neither the data line nor the clock line has been pulled low by the system interface, the transmission process continues and the keyboard interface pulls the data line low (block 58) at time t2 illustrated in FIG. 6. Even at this point, the keyboard interface continues to check and see if the clock line has been pulled low by the system interface (diamond 60). If it has, the keyboard interface exits to marker 3 at which point the keyboard interface stores the data to be transmitted in a buffer (not shown) and processes the interrupt signal from the system interface as illustrated in FIG. 3B. If the clock line has not been pulled low, the keyboard interface prepares eight bits of data to be transmitted (block 62). The keyboard interface then pulls the clock line low at time t3 illustrated in FIG. 6.

In the preferred embodiment, the start bit is indicated when both lines 16, 17 are pulled low, such as between times t3 and t4. The clock line is then pulled high at time t4 as shown in FIG. 6 after a predetermined delay according to a square wave clock signal. In other words, a square wave clock signal with a predetermined frequency is applied to the clock line 16. These steps are illustrated in blocks 64, 66, 68.

After clock line 16 has been pulled high, the clock line is sensed to see if it is low (diamond 70). If it is, the keyboard interface moves to marker 3 to store prepared data in a buffer and process the interrupt signal (block 61).

If the clock line is not low, the keyboard interface checks the value of the 1st bit (bit 0). If the value of the bit is a "0" (block 72), the data line is pulled low; if the value of the bit is a "1", the data line is pulled high (blocks 74, 76) to supply the 1st bit to data line 17. Then the next bit is prepared and the clock line is checked to see if it is still at logic low (block 78, diamond 80). If the clock line is low, the keyboard interface moves to marker 3 to store the data in the buffer and to process the interrupt signal. If the clock line is high, the clock line is pulled low (block 82) at time t5 illustrated in FIG. 6. The interface then checks to see if all eight bits have been sent (diamond 84). If not all eight bits have been sent, the interface moves to marker 2 to reenter the main program between blocks 66, 68 to send more data and to detect interrupt signals from the system interface as discussed above. If all eight bits have been sent, the clock line is pulled high (block 86) at time t6 as illustrated in FIG. 6. The parity and stop bits are then sent (block 88). After all 11 bits have been transmitted, the transmission process is concluded. Obviously, a different number as well as different type of bits arranged in a different manner may be transmitted by the keyboard interface using essentially the same method and apparatus as that described; all such variations are within the scope of the invention.

As is evident from the process described above, the clock signals on clock line 16 causes the data bits to be strobed and loaded onto data line 17. At the same time, and after the start bit has been transmitted, the status of only the clock line is sensed to determine whether the logic level of the line differs from what it should be as controlled by the keyboard interface. If any difference is detected, this is interpreted as an interrupt signal from the system interface. Upon such detection, the data prepared to be transmitted is stored in a buffer and the keyboard interface processes the interrupt signal to abort the transmission process.

Figure 4:
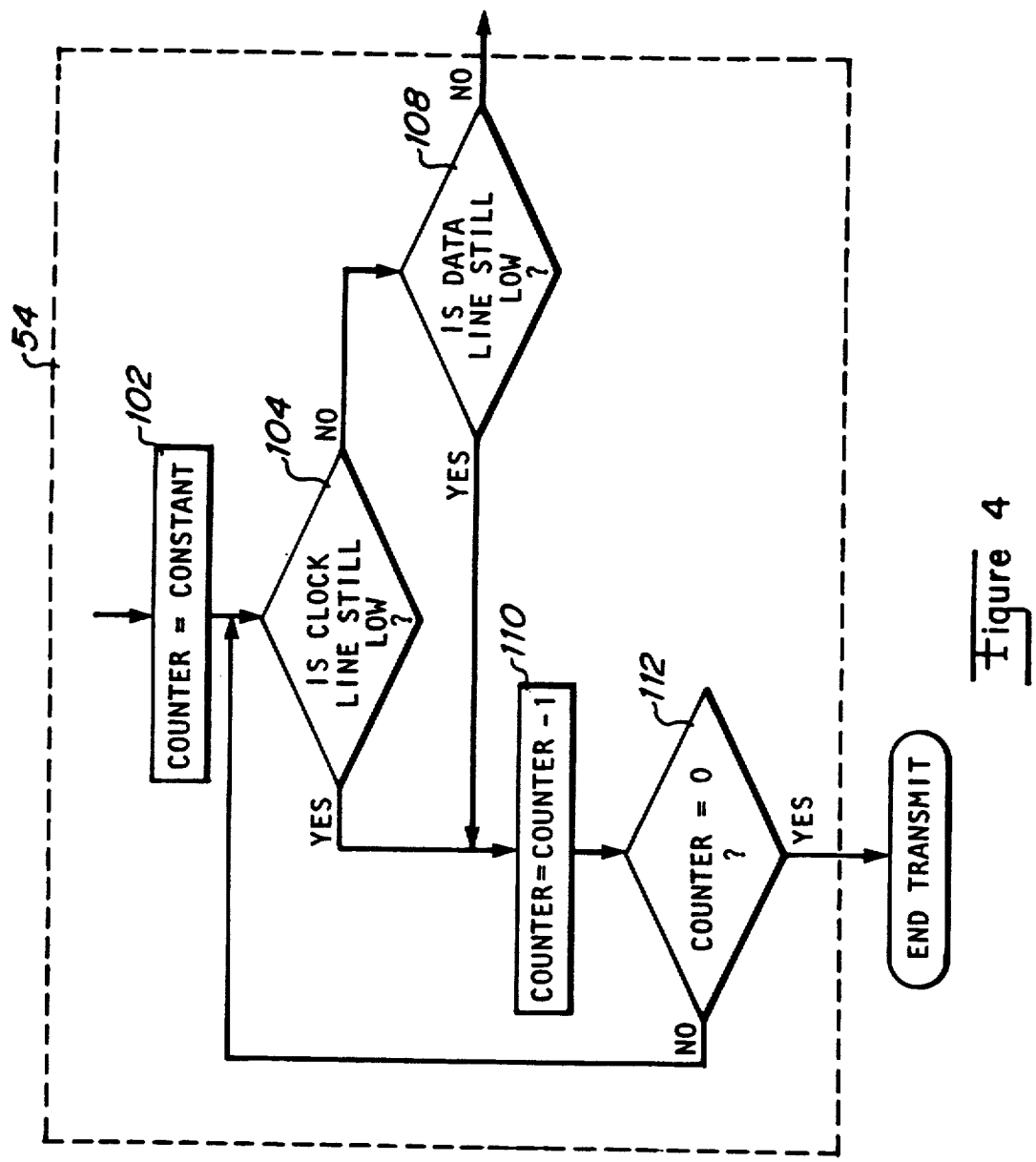
FIG. 4 is a flow chart illustrating a sub-routine of the flow chart of FIGS. 3A, 3B for determining whether an interrupt signal has been received from the system interface before transmission of data.

FIG. 4 is a flow chart illustrating in more detail the sub-routine 54 of FIG. 3A. The microprocessor (not shown in FIG. 2) of the keyboard interface includes a counter. First a constant is stored in the counter (block 102). Then the logic level of the clock line is sensed (diamond 104). If the clock line is not low, the logic level of the data line is sensed (block 106, diamond 108). If the data line is also high, this means that no interrupt signal has been received from the system interface. In such event, the keyboard interface returns to the main program and block 58 of FIG. 3A. If either the clock line or the data line is still low as detected in diamonds 104, 108, the counter is decremented by one (block 110). The reading of the counter is checked to see if it is C (diamond 112). If the counter reads 0, the keyboard interface thereby terminates the transmission process. If the counter is still not 0, the keyboard interface returns to diamond 104 to recheck the clock and data lines. In other words, after the keyboard interface pulls both the clock and data lines high at time t1 in block 50, the keyboard interface checks the logic levels of the two lines for a time period which is a function of the constant stored in the counter. If, at the expiration of such time period, either one or both clock and data lines are still low, the keyboard interface interprets this as an interrupt signal from the system interface and therefore aborts the transmission process before any data is transmitted. The purpose of the subroutine in FIG. 4 is to ensure that the low logic levels on the clock or data lines are indeed caused by the system interface, thereby indicating an interrupt, and not by extraneous factors such as noise.

Marker 3 in the flow chart of FIGS. 3A, 3B is for storing the prepared data in the keyboard interface in a buffer in a microprocessor (not shown in FIG. 2) for temporary storage. The keyboard interface continues to sense the logic level of the clock line. When the interrupt signal is no longer detected, the keyboard interface resumes the transmission process. To send an interrupt signal to stop the keyboard interface from transmitting data, the system interface forces the clock line 16 or data line 17 low.

Figure 5:
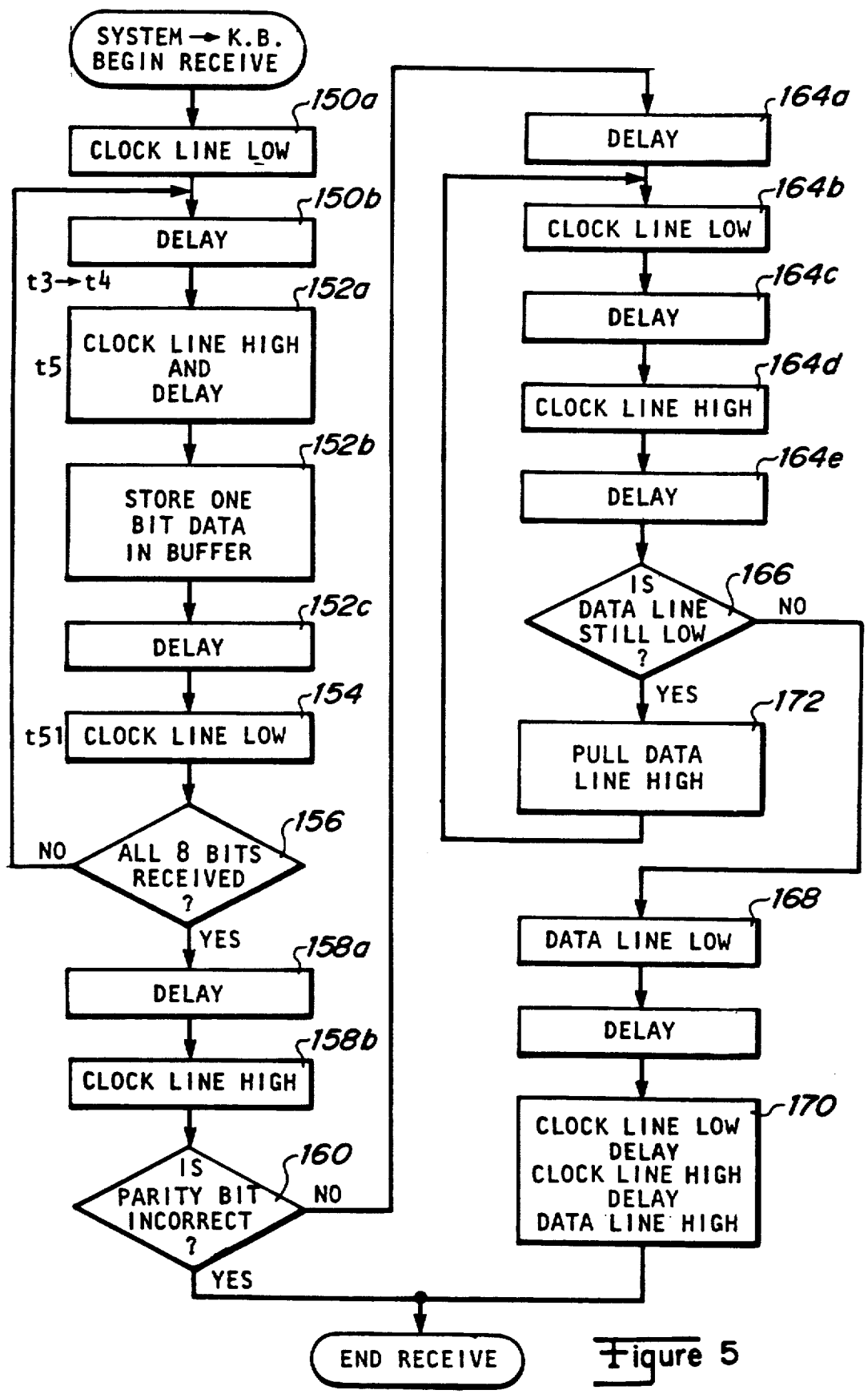
FIG. 5 is a flow chart to illustrate the reception of data from the system interface in the configuration of FIG. 2.
Figure 7:
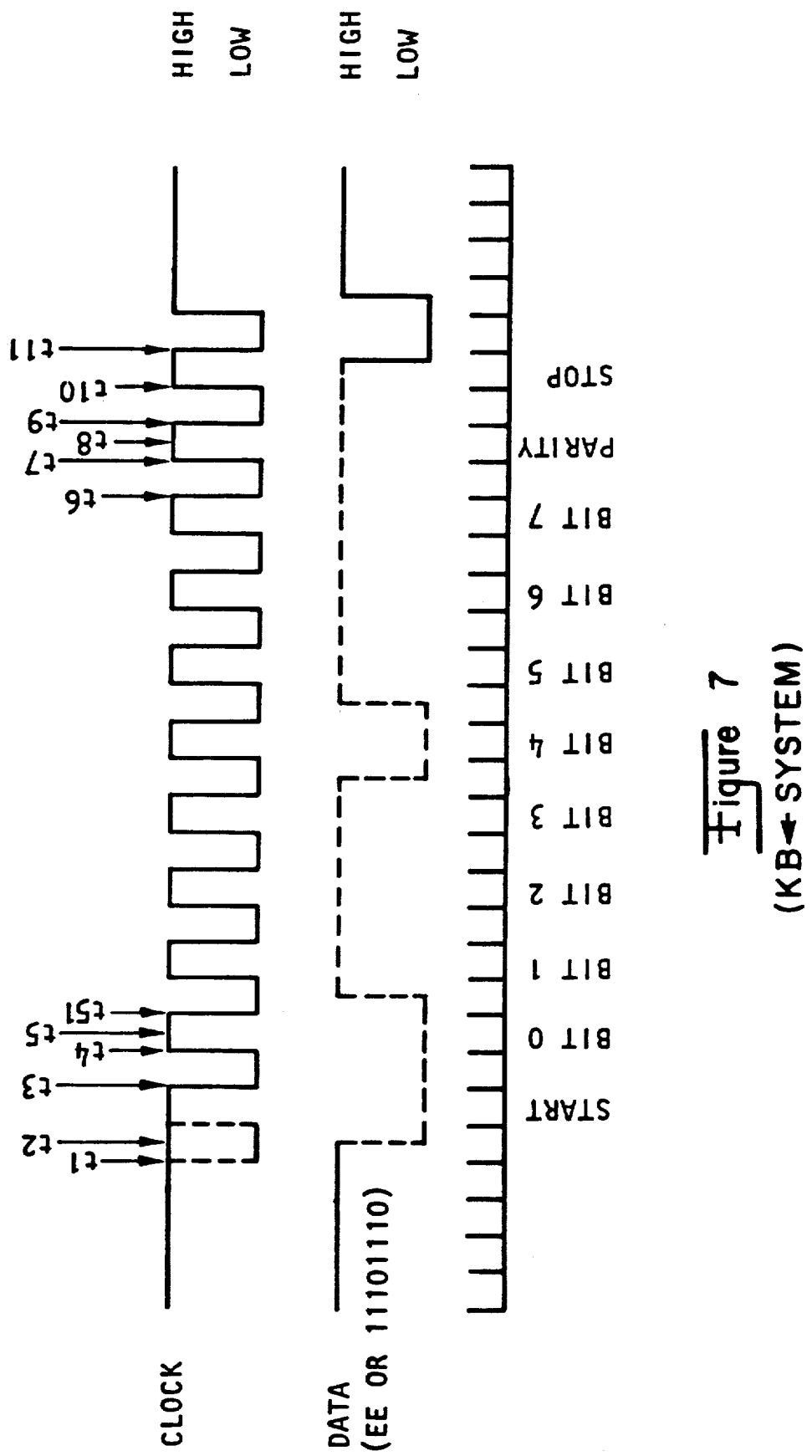
FIG. 7 is a timing diagram illustrating the reception of data by the keyboard interface from the system interface.

FIG. 5 is a flow chart illustrating the steps by which the keyboard interface receives data from the system interface. It is to be interpreted together with the timing diagram of FIG. 7. In FIG. 7, the steps taken by the keyboard interface 5 are illustrated by solid lines and the steps taken by the system interface 4 are illustrated by dotted lines. Upon initiation and before it is determined whether the keyboard interface should transmit or receive data, the keyboard interface always pulls the clock line and data line high (not shown in FIG. 5), such that the logic levels of the two lines before time t1 are as illustrated in FIG. 7. But if the system interface 4 pulls the clock line 16 low for a time period, such as illustrated by the dotted line beginning at time t1, this means that the keyboard interface 5 should stop sending data and/or it should be prepared to receive data.

If the system interface 4 also pulls the data line 17 low such as illustrated at time t2 in FIG. 7, this signal causes the keyboard interface to stop all functions or processes except to start receiving data. After the system interface pulls the clock line low at time t1, it pulls the clock line high again; the low logic level of the data line and high logic level of the clock line convey a start bit code to the keyboard interface. The keyboard interface then applies a square-shaped clock signal to the clock line and pulls the clock line low at time t3 and pulls it high again at time t4 as shown in FIG. 7 (blocks 150a, 150b). As indicated above, the keyboard interface is ready to receive data from the data line 17 when the clock line is at a high logic level. Therefore, at time t5, the keyboard interface 5 receives and stores in a buffer (not shown in FIG. 2) one bit of data from the system interface through data line 17 (blocks 152a-152c). At time t51, clock line is pulled low (block 154).

As shown in FIG. 7, M bits of data are transmitted by the system interface to the keyboard interface where M is 8 and the data transmitted is 11101110. The above steps are illustrated in blocks 150-154. The keyboard interface then checks to see if all 8 bits have been received (diamond 156). If they have not been, the keyboard interface returns to block 150b. The bits of data are stored in a buffer (not shown in FIG. 2) as illustrated in block 152b. If all 8 bits have been received, the keyboard interface will apply a cycle of low and high logic levels such as at times t6 and t7 in FIG. 7 (blocks 158a, 158b). When a clock line has been pulled high at time t7, the keyboard interface receives a parity bit from line 17. When odd parity is adopted, the microprocessor (now shown in FIG. 2) in the keyboard interface adds the number of 1's stored in the buffer to the parity bit to see if the result is odd. If the result is even, this indicates that the data received is incorrect so that the 8 bits of data received will be discarded from the buffer. The process of receiving data is thereby terminated. At that point, the keyboard interface may notify the system interface to retransmit data, such as by repeating the above described steps beginning at block 150a.

If the result of the parity check indicates that the data received is correct (diamond 160), line 16 is pulled low and high after delays such as at times t9 and t10 in FIG. 7 (blocks 164a-164e) whereupon the keyboard interface senses whether the data line is low (diamond 166). In the preferred embodiment, the data line at the logic high level indicates the stop bit code. Interference and noise from the environment may affect the logic level of data line 17 at this time. For this reason, the logic level of line 17 is sensed continuously to determine whether it remains at a steady high logic level as illustrated in the loop consisting of blocks 164a-164e, diamond 166 and block 172, block 172 being described below. If the data line does remain at a steady logic high level, the stop bit code is recorded and line 17 is pulled low first and then line 16 is pulled low such as at time t11 in FIG. 7 (blocks 168, 170). The two lines are again pulled high after a time period (block 170) to indicate the end of receiving data. With both lines high, the keyboard interface is ready to perform the next cycle of data transmission or reception. If the data line is low (diamond 166), it is pulled high (block 172) and the keyboard interface returns to block 164b until the data line remains at a high level.

While the invention has been described with reference to a preferred embodiment, it will be understood that various modifications or improvements can be made without departing from the scope of the invention which is to be limited only by the appended claims.

What is claimed is:

1. A keyboard interface apparatus for communication with a system interface, comprising:
   a keyboard interface having a first input/output port for sending and receiving data and clock signals, and a second input/output port for sending and receiving data signals;
   a clock line connecting the first input/output port to the system interface; and
   a data line connecting the second input/output port to the system interface;
   wherein the keyboard interface senses the clock line through the first input/output port and the data line through the second input/output port for detecting status signals from the system interface, and for controlling transmission and reception of data from the system interface through the data line and the second input/output port.

2. The apparatus of claim 1, wherein the keyboard interface applies digital signals to the clock line and the data line to control the transmission and reception of data, and to transmit and receive data from the system interface, wherein the system interface sends interrupt signals to the keyboard interface by affecting the digital signals on the clock line and the data line, and wherein the keyboard interface detects the interrupt signals by detecting whether the digital signals on the clock line and the data line, are different from those applied by the keyboard interface.

3. A method for controlling transmission of data from a keyboard apparatus to a system interface, said keyboard apparatus comprising a keyboard interface, a clock line and a data line for sending digital signals, the clock and data line connecting the keyboard interface and the system interface, wherein the system interface communicates interrupt signals by affecting the digital signals on the clock line and the data line, said method comprising the steps of:
   transmitting data to the system interface through the data line by applying predetermined sequences of digital signals on the clock line and the data line;
   sensing the digital signals on the clock line and the data line to detect any interrupt signal from the system interface, said interrupt signal affecting the digital signals on the clock line and the data line; and
   terminating the transmission of data when an interrupt signal is sensed, wherein said sensing step sense interrupt signals by sensing whether the digital signals on at least one of the clock line and the data line is different from that set by the keyboard interface.

4. The method of claim 3, wherein said sensing step comprises the steps of:
   setting the clock line and the data line to predetermined digital signals before any data is transmitted;
   sensing whether at least one of the digital signals of the clock line and the data line differs from that set by the keyboard interface during the step of setting; and
   automatically terminating the transmission of data if the digital signal of at least one of the clock line and the data line differs from that set by the keyboard in the step of setting.

5. The method of claim 4, wherein said predetermined digital signals are high logic level signals, and said step of sensing senses whether any one of the clock line and the data line is changed to a low logic level signal by the system interface to indicate an interrupt signal.

6. The method of claim 3, further comprising the step of storing data to be transmitted in a buffer of the keyboard interface when an interrupt signal from the system interface is sensed.

7. The method of claim 3, wherein in the step of transmitting, before data is transmitted, the keyboard interface transmits a start bit by pulling the clock line and the data line to a high and a low logic levels, respectively.

8. The method of claim 3, wherein in the step of transmitting, after data has been transmitted, the keyboard interface transmits a parity bit for checking whether the data was accurately transmitted.

9. The method of claim 3, wherein the step of transmitting, after the parity bit has been transmitted, the keyboard interface transmits a stop bit.

10. The method of claim 3, wherein a stop bit is sent in the transmitting step, and after the stop bit has been transmitted, the keyboard interface applies predetermined digital signals to the clock line and the data line to prepare for a second transmission process.

11. A method for controlling reception of data by a keyboard apparatus from a system interface, said keyboard apparatus comprising a keyboard interface, a clock line and a data line for sending digital signals, the clock and data line connecting the keyboard interface and the system interface, wherein the system interface transmits a parity bit in addition to data bits, said method comprising the steps of:

setting the clock line and data line to predetermined logic levels indicative of status signals with the system interface;

sensing status signals from the system interface with the keyboard interface;

sending data bits and a parity bit from the system interface to the keyboard interface using the data line;

when the status signals indicate data reception, receiving data bits and a parity bit from the system interface through the data line; and comparing with the keyboard interface the data bits and the parity bit received to determine whether the data bits were accurately received.

12. The method of claim 11, wherein said method further comprises the step of storing the value of the parity bit in a buffer of the keyboard interface with the data received after the parity checking step indicates the data bits were accurately received.

13. The method of claim 11, wherein said method further comprises the step of continually checking the signal on the data line to reduce effects of noise after the step of comparing indicates the data bits were accurately received.

14. The method of claim 13, wherein the step of sending further comprises the step of sending a stop bit to the keyboard interface after the party bit, and wherein said method further comprises a step of storing the stop bit in a buffer of the keyboard interface and the step of terminating reception of data from the system interface when the data line is at a stable logic level.

15. The method of claim 11, wherein said method further comprises a step of automatically terminating reception of data by the keyboard interface from the system interface after the parity checking step indicates the data received was inaccurate.

* * * * *